United States Patent [19]

Runkler et al.

[11] Patent Number: 6,094,646
[45] Date of Patent: Jul. 25, 2000

[54] METHOD AND APPARATUS FOR COMPUTERIZED DESIGN OF FUZZY LOGIC RULES FROM TRAINING DATA VECTORS OF A TRAINING DATASET

[75] Inventors: Thomas A. Runkler, Munich, Germany; James C. Bezdek, Pensacola, Fla.

[73] Assignee: Siemens Aktiengesellschaft, Munich, Germany

[21] Appl. No.: 08/912,333

[22] Filed: Aug. 18, 1997

[51] Int. Cl.[7] .................................................. G06N 7/02
[52] U.S. Cl. .................................................. 706/52
[58] Field of Search .......................... 706/52, FOR 106, 706/59, 61, 62, 12, 14, 6

[56] References Cited

U.S. PATENT DOCUMENTS

| | | | |
|---|---|---|---|
| 5,179,634 | 1/1993 | Matsunaga et al. | 706/59 |
| 5,251,288 | 10/1993 | Nomura et al. | 706/12 |
| 5,422,984 | 6/1995 | Iokibe et al. | 706/12 |
| 5,463,718 | 10/1995 | Maeda et al. | 706/12 |
| 5,479,580 | 12/1995 | Kinoshita | 706/12 |
| 5,546,506 | 8/1996 | Araki et al. | 706/61 |
| 5,594,835 | 1/1997 | Rahman et al. | 706/2 |
| 5,608,846 | 3/1997 | Mitsubuchi et al. | 706/59 |
| 5,751,908 | 5/1998 | Madau et al. | 706/9 |
| 5,758,025 | 5/1998 | Wu | 706/3 |
| 5,805,773 | 9/1998 | Kometani et al. | 706/1 |
| 5,822,740 | 10/1998 | Haissig et al. | 706/3 |
| 5,924,085 | 7/1999 | Werbos | 706/2 |

OTHER PUBLICATIONS

Pal, N.; Pal, K.; Bezdek, J.; "A Mixed c–Means Clustering Model"; Proceedings of the Sixth IEEE International Conference on Fuzzy Systems; vol. 1, pp. 11–21, Jul. 1997.

Castellano, G.; Attolico, G.; Stella, E.; Distante, A.; "Automatic Generation of Rules for a Fuzzy Robotic Controller"; Proceedings of the 1996 IEEE/RSJ International Conference on Intelligent Robots and Systems; vol. 3, pp. 1179–1186, Nov. 1996.

Hsu, S.–C.; Hsu, J.; Chiang, I–J. "Automatic Generation of Fuzzy Control Rules by Machine Learning Methods"; 1995 IEEE International Conference on Robotics and Automation; vol. 1, pp. 287–292, May 1995.

Murata, T.; Ishibuchi, H.; "Adjusting Membership Functions of Fuzzy Classification Rules by Genetic Algorithms"; Proceedings of the 1995 IEEE International Conference on Fuzzy Systems; vol. 4, pp. 1819–1824, Mar. 1995.

Iokibe, T.; "A Method for Automatic Rule and Membership Function Generation by Discretionary Fuzzy Performance Function and its Application to a Practical System"; Proceedings of the First International Joint Conference of the North American Fuzzy Informa, Dec. 1994.

*Primary Examiner*—Tariq R. Hafiz
*Assistant Examiner*—Todd Ingberg
*Attorney, Agent, or Firm*—Hill & Simpson

[57] ABSTRACT

In an apparatus and method for computerized design of fuzzy rules from training data vectors, a membership function type is selected from a set of predetermined membership function types, and membership values for the training data vectors and center of gravity values for the membership functions are determined in alternation in an iterative method for all training data vectors and for each membership function. When an abort criterion is met, then the most recently determined membership functions, described by the center of gravity values, are employed as rules.

42 Claims, 3 Drawing Sheets

METHOD AND APPARATUS FOR COMPUTERIZED DESIGN OF FUZZY LOGIC RULES FROM TRAINING DATA VECTORS OF A TRAINING DATASET

BACKGROUND OF THE INVENTION

1. Field of the Invention

The present invention is directed to a method for computerized design of fuzzy logic rules from training vectors of a training dataset, as well as to an apparatus for implementing the method.

2. Description of the Prior Art

In the framework of so-called "unsharp" logic (fuzzy logic), technical systems are known which make use of so-called if/then rules. The relationships between the input quantities of the rules and the output quantities of the rules are defined by means of membership functions that supply a value between 0 and 1 for every input value and output value. The rules, which are combinations of membership functions, are formulated by persons knowledgeable in this field in some instances. This procedure is referred to as "manual" design because the rules are defined by knowledgeable persons who can describe the technical system in detail in terms of its behavior.

Usually, however, the rules are defined on the basis of training data vectors that contain the output values (specified values) corresponding to various input values (actual values). This procedure is referred to as "automatic" design.

The training data, for example, can be determined by measuring instruments, for example sensors, and describe the real behavior of the system. A technical system can, for example, be a washing machine, a factory procedure, communication equipment, a communication network, etc. The type of system is not critical tot he rule formation procedure.

A large variety of membership functions can be employed in the framework of fuzzy logic. As used herein, a "membership function type" means a type of membership function that is unambiguously described by its form. An overview of various membership function types can be found in Klir et al., *Fuzzy Sets and Fuzzy Logic—Theory and Applications*, Prentice Hall P T R, New Jersey, ISBN 0-13-101171-5, pp. 97–102, 1995.

Various cluster algorithms are usually employed in the methods for automatic rule design.

What is understood by clustering is a method with which a set $X=\{x_1, \ldots, x_n\} \subset \Re^p$ is grouped in sub-sets (clusters) $c \in \{2, \ldots, n-1\}$ that represent a sub-structure of the set X. The training data vectors of the training dataset that is employed for rule design is referenced $x_1, \ldots, x_n$. The training dataset contains n training data vectors. A partition matrix $U \in M=[0,1]^{cn}$ describes the division of the set X into the individual clusters. Each element $u_{ik}$, i=1, . . . , c; k=1, . . . , n, of the partition matrix U represents the membership of the training data vector $x_k \in X$ to the $i^{th}$ cluster. The designation $u_{ik}$ is used below to refer to the membership value of the $k^{th}$ training data vector $x_k$ to the $i^{th}$ cluster.

A model known as the fuzzy C-means model (FCM) that is utilized for automatic rule design is known from J. C. Bezdek, *Pattern Recognition with Fuzzy Objective Function Algorithms*, Plenum Press New York, ISBN 0-306-40671-3, pp. 65–79, 1981.

FCM forms a fuzzy partition $M_{fcn}$ defined as:

$$M_{FCM} = \left\{ U \in M \middle| \sum_{i=1}^{c} u_{ik} = 1, k = 1, K, n, \sum_{i=1}^{n} u_{ik} > 0, i = 1, K, c \right\} \quad (1)$$

The FCM is defined as the following problem:

With a given training dataset X, an arbitrary norm $\|.\|$ on the space $\Re^p$ and a prescribable fuzzy parameter $m \in (1, )$, the following target function is to be minimized:

$$J_{FCM}(U, V, X) = \sum_{k=1}^{N} \sum_{i=1}^{c} u_{ik}^m \|x_k - v_i\|^2 \quad (2)$$

A set of centers of membership functions employed is referenced $V=\{v_1, \ldots, v_c\} \subset \Re^p$.

In the FCM alternating optimization method (FCM-AO) likewise described in Bezdek, cluster centers are initialized with arbitrary vectors $v_i \in \Re^p$, i=1 . . . c. In an iterative method, membership values $u_{ik}$ for the training data vectors $x_k$ and the cluster centers $v_i$ are determined in alternation dependent on the previously identified membership values $u_{ik}$. This iterative method is ended when either a maximum number of iterations has been implemented or when the change of the center of gravity values for preceding iterations is smaller than a prescribable threshold. The membership values $u_{ik}$ are formed according to the following rule in each iteration for all training data vectors:

$$u_{ik} = \frac{1}{\sum_{j=1}^{c} \left( \frac{\|x_k - v_i\|_A}{\|x_k - v_j\|_A} \right)^{\frac{2}{m-1}}}, i = 1 \ldots, c; k = 1, \ldots, n \quad (3)$$

The centers $v_i$ of the membership functions are formed according to the following rule by a determination of center of gravity values for respective membership function:

$$v_i = \frac{\sum_{k=1}^{n} u_{ik}^m x_k}{\sum_{k=1}^{n} u_{ik}^m}, i = 1, \ldots, c \quad (4)$$

Another model known as the possibilistic C-means model (PCM) is known from Krishnapuram et al., *A possibilistic approach to clustering, IEEE Transactions on Fuzzy-Systems*, Vol. 1, No. 2, pp. 98–110, 1993. The PCM differs from the FCM on the basis of a modified target function. The target function $J_{FCM}$ of the FCM has a penalty term added to it.

The target function $J_{PCM}$ in the PCM is formed according to the following rule:

$$J_{PCM}(U, V; X) = \sum_{k=1}^{n} \sum_{i=1}^{c} (u_{ik}^m \|x_k - v_i\|^2 + \eta_i (1 - u_{ik})^m) \quad (5)$$

An auxiliary factor $\eta_i$ is formed according to the following rule:

$$\eta_i = K \sum_{k=1}^{n} \frac{u_{ik}^m \|x_k - v_i\|^2}{\sum_{k=1}^{n} u_{ik}^m} \quad (6)$$

The factor $K \in \Re^+ \backslash \{0\}$ is usually selected as value 1.

The following rule is another possibility for determining the auxiliary factor $\eta_i$:

$$\eta_i = \frac{\sum_{k=1}^{n} (u_{ik})^{\geq \alpha} \|x_k - v_i\|^2}{\sum_{k=1}^{n} (u_{ik})^{\geq \alpha}} \quad (7)$$

With a prescribable value $\alpha \in (0,1)$, a factor $(u_{ik})^{\geq \alpha}$ is determined according to the following rule:

$$(u_{ik})^{\geq \alpha} = \begin{cases} 0, & \text{if } u_{ik} < \alpha \\ 1, & \text{if } u_{ik} \geq \alpha \end{cases} \quad (8)$$

An alternate method (PCM-AO) for minimizing the target function in PCM is also known from Krishnapuram et al. In the method fundamentally designed the same as in FCM-AO, the membership values $u_{ik}$ are formed according to the following rule, and it is assumed that $\eta_i > 0 \forall i$ is respectively valid for the auxiliary factor:

$$u_{ik} = \frac{1}{1 + \left(\frac{\|x_k - v_i\|_A}{\sqrt{\eta_i}}\right)^{\frac{2}{m-1}}}, i = 1 \ldots, c; k = 1, \ldots, n \quad (9)$$

The following rule is employed for determining the respective centers $v_i$ of the membership functions in every iteration:

$$v_i = \frac{\sum_{k=1}^{n} u_{ik}^m x_k}{\sum_{k=1}^{n} u_{ik}^m}, i = 1, \ldots, c \quad (4)$$

After the conclusion of this iterative method, centers of the respective membership functions are identified in FCM-AO as well as PCM-AO. The membership functions positioned over the identified centers $v_i$ of the membership functions are interpreted as rules of the fuzzy system.

The elements of the partition matrix U that derives from FCM-AO or from PCM-AO are values of the membership functions $$u_i: X \to [0,1], i=1, \ldots, c$$

for the clusters in X, whereby $$u_i(x_k) = u_{ik}, i=1, \ldots, c; k=1, \ldots, n.$$

Below, the values $\{u_i(x_k)\}$ are interpreted as observations of expanded membership functions $$\mu_i: \Re p \to [0,1], \mu_i(x_k) = u_i(x_k) = u_{ik}, k=1, \ldots, n \quad (10)$$

The expanded membership functions $\eta_i$ are formed for FCM-AO according to the following rule:

$$u_i(x) = \frac{1}{\sum_{j=1}^{c} \left(\frac{\|x - v_i\|_A}{\|x - v_j\|_A}\right)^{\frac{2}{m-1}}}, i = 1 \ldots, c \quad (11)$$

For PCM-AO, the expanded membership functions $\eta_i$ are determined according to the following rule:

$$u_i(x) = \frac{1}{1 + \left(\frac{\|x - v_i\|_A}{\sqrt{\eta_i}}\right)^{\frac{2}{m-1}}}, i = 1 \ldots, c \quad (12)$$

A considerable disadvantage of the known methods is that the form of the membership functions is fixed both in FCM or in FCM-AO, as well as in PCM or in PCM-AO. A non-convex, bell-shaped function arises in FCM, and the Cauchy function arises in PCM. In FCM-AO as well as in PCM-AO, the method is thus limited to a fixed type of membership function.

Other forms of membership functions and thus other membership function types, can only be obtained by a subsequent approximation of the membership function given this method. This leads to a considerable imprecision of the identified rules.

SUMMARY OF THE INVENTION

An object of the present invention is to provide a computerized method and apparatus with which rules can be automatically determined using arbitrary, freely selectable membership function types.

In a first version of a method for computerized design of fuzzy logic rules from training data vectors of a training dataset according to the invention, a membership function type is freely selected from a predetermined set of membership function types. A number of membership functions of the selected membership function type have initialization parameters allocated to them, and the following steps are iteratively implemented for each membership function and for all training data vectors until an abort criterion is met:

Membership values for the training data vectors are determined and stored for clusters described by membership functions;

Using the membership values, a center of gravity value of the membership function is determined and stored;

A further iteration is implemented, whereby the membership functions in each iteration are described by the center of gravity value determined in the preceding iteration.

The identified membership functions are described by the identified center of gravity values of the last iteration. The identified membership functions are employed as rules.

In a second version of the inventive method, the rules determined in the above-described way are employed for the control of a machine (technical system). The machine is controlled using the identified rules.

In a third version of the inventive method, initialization parameters are not allocated to the membership functions of the selected membership function type; instead initial membership values for the individual membership functions are allocated to the training data vectors. The remaining method steps of this third version correspond to the first version.

Rules determined according to the third version can also be utilized for the control of a machine in a fourth version of the method.

In an apparatus according to the invention, a calculating unit that is configured for implementing the following steps for the design of fuzzy logic rules from training data vectors of a training dataset:

A membership function type is freely selected from a predetermined set of membership function types;

A plurality of membership functions of the selected membership function type have initialization parameters allocated to them;

The following steps are iteratively implemented for each membership function and for all training data vectors until an abort criterion is met:

Membership values for the training data vectors are determined and stored for clusters described by membership functions;

Upon employment of the membership values, a center of gravity value of the membership function is determined and stored;

A further iteration is implemented, whereby the membership function in each iteration is described by the center of gravity value determined in the preceding iteration;

The determined membership functions are described by the center of gravity values of the last iteration;

The determined membership functions are employed as rules.

The above apparatus, in addition to the calculating unit that implements the steps of the first version of the inventive method, can also contain a control unit for controlling a machine using the identified rules.

The apparatus can alternatively contain a calculating unit that is configured for implementing the third version of the inventive method. This apparatus can also contain a control unit for the control of a machine using the identified rules.

The inventive method and apparatus in all versions allow arbitrarily prescribable membership function types to be utilized for the rule design. An approximation of identified membership functions of the defined type according to the FCM-AO method or PCM-AO method is thus no longer required. This leads to a more exact model of the technical system described by the rules.

In order to obtain optimally exact initialization parameters, it is advantageous to determined the initialization parameters or the initial membership values at the beginning of the method using the FCM method or the FCM-AO method or the PCM method or the PCM-AO method.

The method and apparatus can be utilized for describing or for controlling a large variety of technical systems or machines, for example in the field of steel rolling mills, sewage treatment systems, chemical reactors, etc.

The training data vectors can be determined by measuring instruments and/or sensors and employed within the framework of the invention.

DESCRIPTION OF THE PREFERRED EMBODIMENTS

Figure 1:
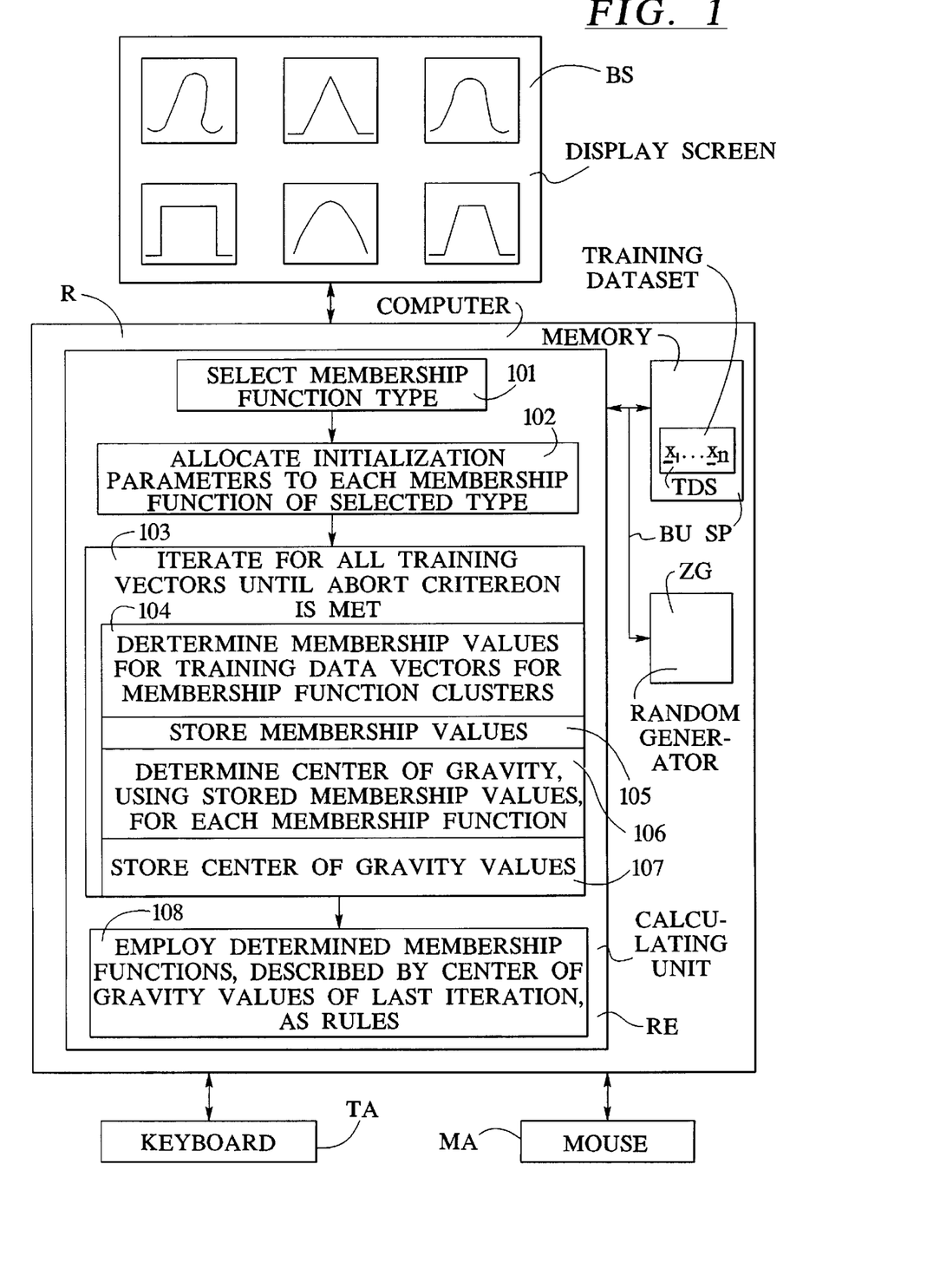
FIG. 1 illustrates a first exemplary embodiment of the inventive method in the form of a flowchart that is implemented in a computer.

A computer R is symbolically shown in FIG. 1. The computer R includes a calculating unit RE and a memory SP that are connected to one another via a bus BU. Further, a keyboard TA and a mouse MA are provided, these being connected to the computer R. A user is graphically shown a set of possible membership function types on a display screen BS that is likewise coupled to the computer R; these membership function types can be employed within the framework of the automatic rule design.

The predetermined set of possible membership function types is stored in the memory SP. Training data vectors $x_k$ of a training data set TDS are also stored in the memory SP, these being taken into consideration in the framework of the automatic computerized rule design.

The user selects the membership function type that is to be subsequently employed from the set of possible membership function types (step 101).

An overview of various membership function types can be found in Klir et al.

FIGS. 4a through 4i show membership function types that can serve for the determination of the membership values $u_{ik} = \mu_i(x_k)$, i=1, ..., c; k=1, ..., n.

The definitions are valid for any arbitrary norm on the space $\Re^p$. For simpler presentation, the Euclidean norm is employed below for the description of the membership functions and the one-dimensional case is assumed, so that the vector x is a scalar quantity x and the centers $v_i$ also assume scalar values.

Figures 3, 4A, 4B, 4C:
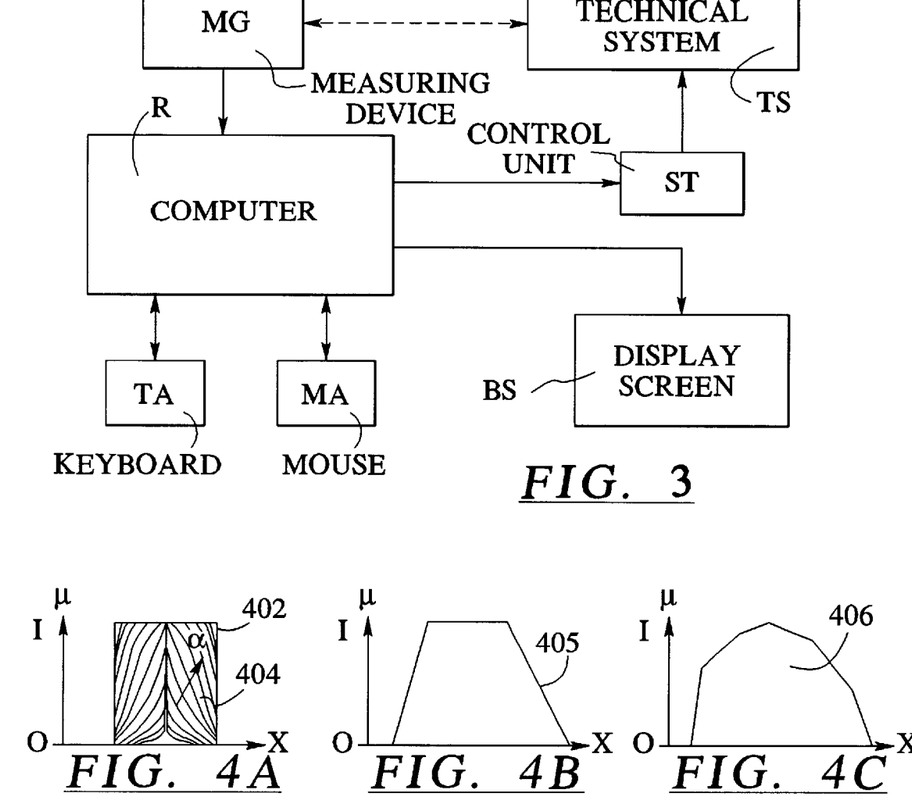
FIG. 3 is a block diagram of a technical system for which training data vectors are determined by a measuring instrument and for designing the fuzzy logic rules in accordance with the invention, that are in turn employed for the control of the technical system.
FIGS. 4a–i are sketches of various membership function types from which a membership function can be selected in the inventive method and apparatus.

FIG. 4a shows hyper-cylindrical membership function types with the center $v_i \in \Re$ and the radius $r_i \in \Re$. In the one-dimensional Cartesian case, this is a rectangular membership function type 402. The hyper-cylindrical membership function type is described by the following rule:

$$u_i = \begin{cases} 1 & \text{for } \|x - v_i\| \le r_i \\ 0 & \text{otherwise} \end{cases} \tag{13}$$

FIG. 4a also shows hyper-conical membership function types that correspond to triangular membership function type 404 in the one-dimensional Cartesian case, whereby the membership functions are formed according to the following rule:

$$u_i(x) = \begin{cases} 1 - \dfrac{\|x - v_i\|}{r_i} & \text{for } \|x - v_i\| \le r_i \\ 0 & \text{otherwise} \end{cases} \tag{14}$$

Expanded hyper-conical membership function types are also shown in FIG. 4a. Membership functions of this membership function type are formed according to the following rule:

$$u_i(x) = \begin{cases} 1 - \left(\dfrac{\|x - v_i\|}{r_i}\right)^\alpha & \text{for } \|x - v_i\| \leq r_i \\ 0 & \text{otherwise} \end{cases} \quad (15)$$

A trapezoidal membership function type 405 is shown in FIG. 4b. Membership functions of this type are formed according to the following rule:

$$u_i(x) = \begin{cases} 0 & \text{for } x < a_i \\ \dfrac{x - a_i}{b_i - a_i} & \text{for } a_i \leq x < b_i \\ 1 & \text{for } b_i \leq x < c_i \\ \dfrac{d_i - x}{d_i - c_i} & \text{for } c_i \leq x < d_i \\ 0 & \text{for } x \geq d_i \end{cases} \quad (16)$$

whereby $a_i$ and $d_i$ reference end points and $b_i$ and $c_i$ reference intermediate points of the trapezoid. $a_i \leq b_i \leq c_i \leq d_i$ applies.

FIG. 4c shows a membership function typ that comprises linear membership functions 406 in sections.

Figure 4D:
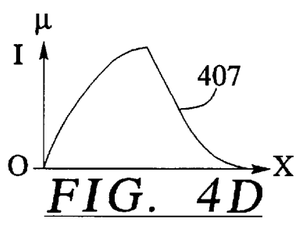

FIG. 4d shows a membership function type with membership functions 407 that are polynomial in sections. Membership functions of this membership function type are formed according to the following rule:

$$\mu_i(x) = \sum_{k=0}^{n} w_k x^k \quad (17)$$

with $w_0, \ldots, w_n, x \in \Re, n \in N$.

Figure 4E:
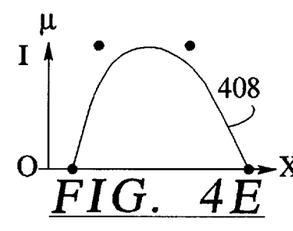

A membership type known as a B-spline 408 is shown in FIG. 4e. B-splines contain soft, sectional polynomial curves. In the two-dimensional space, they are described by hit points $\{(t_{1i}, p_{1i}), \ldots, (t_{ni}, p_{ni})\}$.

In general, B-splines are formed according to the following rule:

$$u_i(x) = \sum_{j=0}^{n} p_{ij} N_{jki}(x) \quad (18)$$

with $$N_{jki}(x) = \dfrac{x - t_{ij}}{t_{(j+k-1)i} - t_{ij}} N_{j(k-1)i}(x) + \dfrac{T_{(j+k)i} - x}{t_{(j+k)i} - t_{(j+1)i}} N_{(j+1)(k-1)i}(x) \quad (19)$$

if $k > 1$, and $$N_{j1i}(x) = \begin{cases} 1 & \text{if } t_{ij} \leq x < t_{(j+1)i} \\ 0 & \text{otherwise} \end{cases} \quad (20)$$

Figure 4F:
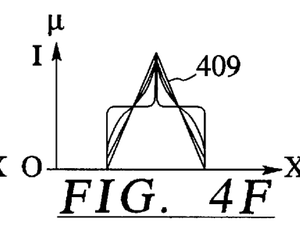

A membership function type with trigonometric membership functions 409 is shown in FIG. 4f. Membership functions of this type are formed according to the following rule:

$$u_i(x) = \begin{cases} \dfrac{\sin(2\|x - v_i\|t - t) + \sin t}{2 \sin t} & \text{if } \|x - v_i\| < 1, t \in \left[0, \dfrac{\pi}{2}\right] \\ 0 & \text{otherwise} \end{cases} \quad (21)$$

or $$u_i(x) = \begin{cases} \dfrac{\tan(2\|x - v_i\|t - t) + \tan t}{2 \tan t} & \text{if } \|x - v_i\| < 1, t \in \left[-\dfrac{\pi}{2}, \dfrac{\pi}{2}\right] \\ 0 & \text{otherwise} \end{cases} \quad (22)$$

Figure 4G:
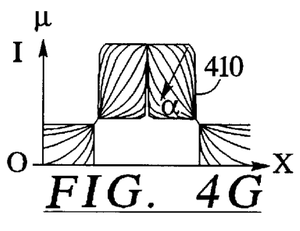

FIG. 4g shows an exponential membership function type 410 with form parameters and variance parameters $\alpha$, $\sigma_1 \in \Re^+ \backslash \{0\}$. Membership functions of these membership function types are formed according to the following rule:

$$u_i(x) = e^{-\left(\frac{\|x - v_i\|}{\sigma_i}\right)^\alpha} \quad (23)$$

Figure 4H:
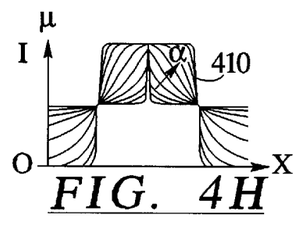

A membership type known as a Cauchy function 411 is shown in FIG. 4h. Cauchy functions are formed according to the following rule:

$$u_i(x) = \dfrac{1}{1 + \left(\dfrac{\|x - v_i\|}{\sigma_i}\right)^\alpha} \quad (24)$$

Figure 4I:
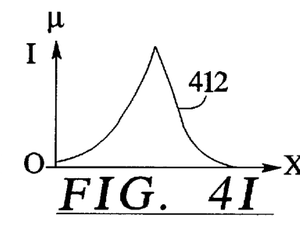

Membership functions of a so-called paired sigmoidal membership function type 412 (see FIG. 4i) are formed according to the following rule:

$$u_i(x) = \min\left(\dfrac{2}{1 + e^{\frac{x - v_i}{\sigma_{i1}}}}, \dfrac{2}{1 + e^{\frac{v_i - x}{\sigma_{i2}}}}\right) \quad (25)$$

After selection of the membership function type to be employed, initialization parameters are determined in a second step 102 for at least two membership functions of the membership function type, with the required form parameters of the membership function as well as the centers of the membership functions being initially freely predetermined. In order to obtain optimally exact initialization parameters, it is advantageous to determine the initialization parameters at the beginning of the method using one of the FCM method or the FCM-AO method or the PCM method or the PCM-AO method.

The determination can be carried out by the user or can ensue with a random generator ZG.

In an iterative loop 103, a sequence of method steps that correspond to the principle of alternating optimization (AO) described above are implemented until an abort criterion is met.

The abort criterion of the iteration loop 103 can be a maximum number of iterations to be implemented and/or a predetermined change of the centers $v_i$ of the membership functions between at least a preceding and the current iteration and/or a predetermined change of the membership values $u_{ik}$ between at least a preceding and the current iteration.

The following method steps are implemented in the calculating unit RE in every iteration:

Using the respective rule of the membership functions of the selected membership function type, membership values $u_{ik}$ are determined (step 104) and stored (step 105) for all training data vectors $x_k$.

Using the membership values $u_{ik}$ determined in the iteration, center of gravity values for the membership functions are determined in a further step 106 and stored in a further step 107.

The determination of the center of gravity value corresponds to the determination of the geometrical center of the respective membership function taking the training data vectors $x_k$ and the membership values into consideration. The centers of the membership functions for the respective iteration are derived directly from the center of gravity values. A large variety of methods, for example the basic defuzzification distribution method (BADD) or the method of semi-linear defuzzification (SLIDE), are known to those skilled in the art as methods for determining the center of gravity values for the membership functions.

When the abort criterion is met, then the membership functions are set by the form parameters as well as by the centers of the membership functions identified in the last iteration before the abort of the iteration loop 103.

The identified membership functions, described by the center of gravity values, and thus by the centers of the membership functions from the last iteration, are interpreted and used as the rules to be determined (step 108).

Figure 2:
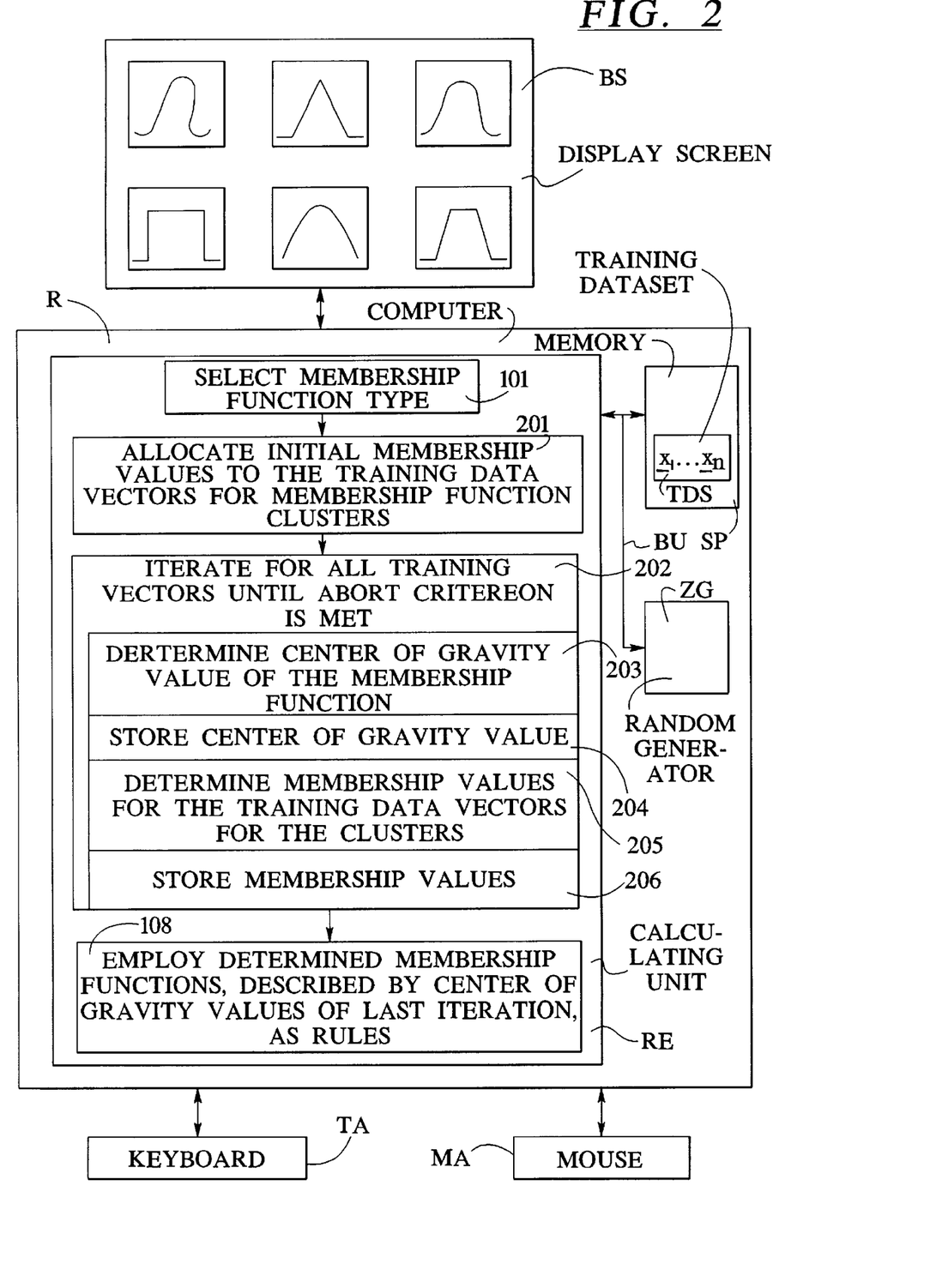
FIG. 2 illustrates a second exemplary embodiment of the inventive method in the form of a flowchart that is implemented in a computer.

A second exemplary embodiment of the invention is shown in FIG. 2.

The second exemplary embodiment differs only slightly from the first exemplary embodiment. Only the method step of initialization and the structure of the iteration loop are different compared to the first exemplary embodiment.

After selection of the membership function type (step 101), initial membership values $u_{ik}$ for the training data vectors $x_k$ are prescribed for the clusters described by the membership functions in the second exemplary embodiment (step 201) instead of the initialization parameters for the membership functions. In order to obtain optimally exact initialization parameters, it is advantageous to determine the initial membership values at the beginning of the method using one of the FCM method or the FCM-AO method, or the PCM method or the PCM-AO method.

The following structure thus derives (step 202) for the iteration loop in this embodiment:

In a first step of the iteration, a respective center of gravity value of the membership function is determined from the membership values (step 203) and is stored (step 204).

In further steps, the membership values for the training data vectors are determined (205) for the membership function and stored (206).

FIG. 3 shows a technical system TS whose behavior is described by training data vectors $x_k$ that are determined via a measuring device MG that is coupled to the technical system TS and are stored in a memory SP of the computer R. One of the above-described embodiments of the method is implemented in the calculating unit RE of the computer R.

After implementation of the method, a set of rules with which the behavior of the technical system TS is described is present.

Via a control unit ST, the technical system TS is controlled using the rules and, possibly, with constant acquisition (updating) of new measured values via the technical system TS.

A possible realization of the invention is recited below in programming language C. The program can be translated into a runnable program with the compiler gcc version 2.7.2.1.f.1 with the option –lm.

```
/****************************************************************************/
/* ace.c*/
/* alternating cluster estimation */
/* for compiler gcc version 2.7.2.1.f.1 option -lm /* by Thomas A. Runkler 4/7/97
/* estimates C clusters in the data set x[N][DIM]
/* and generates a graphical output of the data and
/* the prototypes on stdout in XFIG 3.1 format
#include <math.h>
#define MAXSTEP 1000   /* maximum step number */
#define C 2            /* number of clusters */
#define M 2            /* fuzziness parameter */
#define N 11           /* number of data */
#define DIM 2          /* data dimension */
#define VTH 1.0e-10    /* threshold for comparison
#define XMIN -5        /* minimum and maximum values */
#define XMAX 5         /* of the data components */
#define XOFFSET 4000   /* parameters for the */
#define YOFFSET 4000   /* graphical output */
#define XSCALE 500
#define YSCALE 500
#define VSIZE 60
#define XSIZE 30
double power (double x, double gamma) {
(return exp (gamma*log(x));
};
double dabs (double x) {
return x>0?x:-x;
};
double rand (void) {
return random ( )/2147483648.0;
};
double dist (double *vi, double *xk) {
/* calculate the distance between prototype vi and datum xk
*/
double d=0.0;
double accu;
int 1;
for(1=0; 1<DIM; 1++){
accu=(xk[1]-vi[1]);
```

```
d+=accu*accu;
return sqrt(d);
};
void calc_u (double (*u) [N], double (*v) [DIM], double (*x) [DIM]) {
int i,j,k, flag;
double accu;
/* user specified membership function */
/* in this example we use the FCM membership function */
for (k=0; k<N; k++) {
accu=0.0;
flag=0; /* flag for zero distance */
for (j=0; (j<C) &(!flag); j++) {
    if (!dist(v[i],x[k])) flag=I;
    accu+=I/power (dist(v[i],x[k]),2/(M-1));
};
    if (flag)
       for (i=o; i<C; i++)
         u [i][k] = (i==j ? 1: 0)
    else
       for (i=O; i<C; i++)
         u[i][k]=|/accu/power(dist(v[i],x[k]),2/(M-1));
};
/* to obtain triangular (conical) membership functions, */
/* e.g., use the following instead: */
/* for (i=0; i<C; i++) */
/*   for (k=0; k<N; k++) {*/
/*     accu=1.0-(C+I)/(XMAX-XMIN)/sqrt(DIM)*dist(i,k); */
/*     u[i][k]=accu>0.0? accu:0.0;
/*   }; */
};
void calc_v(double (*u) [N], double (*v) [DIM], double
        (*x)[DIM]) {
        int i,k,l;
double accu,nom,den;
/* user specified prototype calculation */
/* in this example we use the FCM method, i.e. */
/* BADD defuzzification with gamma=m */
for (i=o; i<C; i++)
 for (1=0; 1<DIM; 1++){
   nom=0;
   den=0;
   for (k=0; k<N; k++) {
     accu=power (u [i][k], M);
     nom+=accu*x[k][1];
     den+=accu;
   };
   v[i][I]=den?nom/den: (double) XMIN+rand( )(XMAX-XMIN);
 };
};
void init_v(double (*v)[DIM], double (*vold)[DIM]){
/* initialize prototypes randomly */
/* and set old prototypes to zero */
int i
for (i=0; i<C; i++) {
 v[i][0] = (double) XMIN+rand( )*(XMAX-XMIN);
 v[i][1] = (double) XMIN+rand ( )*(XMAX-XMIN);
 vold [i][0] = 0.0;
 vold[i][1] = 0.0;
};
int limit (double (*v) [DIM], double (*vold) [DIMI){
/* return 1, if one component of v changed more than VTH, */
/* return 0, otherwise */
int i,l;
for (i=0; i<C; i++)
 for(1=0; 1<DIM; 1++)
  if (dabs(v[i][1]-vold[i][1])>VTH) {
    return 1;
 };
return 0;
};
void vold_update (double (*v) [DIM], double (*vold) [DIM]) {
/* copy v into vold */
int i,l;
for (i=0; i<C; i++)
 for(1=0; 1<DIM; 1++)
  vold [i][1] = v [i][1];
};
void plot (double (*v)[DIM], double (*x)[DIM]) {
/* generate graphical output of the data and */
```

-continued

```
/* the prototypes on stdout in XFIG 3.1 format */
int k;
printf ("#FIG 3.1\nPortrait\nCenter\nInches\n12OO 2\n");
/* data */
for (k=o; k<N; k++)
  if
(x [k][0]>=XMIN) && (x [k][0]<=XMAX) && (x [k][1]>=XMIN) && (x [k][1]<=XMAX))
    printf ("I 3 0 1 0 0 0 0 20 0.000 1 0.0000 %d %d %d %d %d
%d %d
%d\n",XOFFSET + (int) (XSCALE*x[k][0]), YOFFSET-
(int) (YSCALE*x[k][1]),XSIZE,XSIZE,X
XOFFSET+ (int) (XSCALE*x[k][0]),YOFFSET-
(int) (YSCALE*x[k][1]), XOFFSET+(int) (XSCAL
LE*x[k][0]) +XSIZE,YOFFSET-(int) (YSCALE*x[k][I]) +XSIZE);
/* prototypes */
for (k=0; k<C; k++)
if
((v [k][0]>=XMIN) && (v [k][0]<=XMAX) && (v [k][i]>=XMIN) && (v [k][1]<=XMAX))
    printf ("I 3 0 1 0 0 0 0 20 0.000 1 0.0000 %d %d %d %d %d
%d %d
%d\n", XOFFSET+ (int) (XSCALE*v[k][0]), YOFFSET-
(int) (YSCALE*v[k][1]), VSIZE,VSIZE,X
XOFFSET+(int) (XSCALE*v[k][0]), YOFFSET-
(int) (YSCALE*v[k][1]) ,XOFFSET+ (int) (XSCAL
LE*V[k][0])+VSIZE,YOFFSET-(int) (YSCALE*v[k][I])+VSIZE);
};
int main (void) }
int k,n;
double u[C][N]; /* memberships */
double x[N][DIM]; /* data */
double v[C][DIM]; /* prototypes */
double vold[C][DIM]; /* old prototypes */
/* example: butterfly dataset */
k=0;
x[k][0]=-15.0/3; x[k++][1]=0.0/3;
x[k][0]=-10.0/3; x[k++][1]=5.0/3;
x[k][0]=-10.0/3; x[k++][1]=0.0/3;
x[k][0]=-10.0/3; x[k++][1]=-5.0/3;
x[k][0]=-5-0/3; x[k++][1]=0.0/3;
x[k][0]=0.0/3; x[k++][1]=0.0/3;
x[k][0]=5.0/3; x[k++][1]=0.0/3;
x[k][0]=10.0/3; x[k++][1]=5.0/3;
x[k][0]=10.0/3; x[k++][1]=0.0/3;
x[k][0]=10.0/3; x[k++][1]=-5.0/3;
x[k][0]=15.0/3; x[k++][1]=0.0/3;
/* ACE - alternating cluster estimation */
/* initialize prototypes */
init_v(v,vold);
/* main loop: terminate v changed less than limit, */
/* maximum MAXSTEP steps */
for (n=0; (n<MAXSTEP) && (limit(v,vold)); n++) {
  /* store old prototypes */
  if (n) vold_update(v,vold);
  /* calculate new partition */
  /* using user defined membership function */
  calc_u (u,v,x);
  /* calculate new prototypes */
  /* e.g. using BADD defuzzification */
  calc_v(u,v,x);
};
/* generate graphical output */
plot(v,x);
return 0;
};
/********************************************************************/
```

Although modifications and changes may be suggested by those skilled in the art, it is the intention of the inventor to embody withing the patent warrented hereon all changes and nodifications as reasonably and properly come within the scope of his contribution to the art.

We claim as our invention:

1. A method for computerized design of fuzzy logic rules, for controlling a technical system, from training data vectors of a training dataset comprising the steps of:

(a) storing a plurality of different membership function types in a computer, each membership function type having a plurality of membership functions, and selecting in said computer one of said plurality of membership function types;

(b) allocating initialization parameters to the plurality of membership functions of the membership function type selected in step (a);

(c) setting an abort criterion and, for each of said plurality of membership functions in the membership function type selected in step (a), iteratively implementing steps (c1), (c2) and (c3) in said computer for all training data vectors,
  (c1) determining and storing membership values for the training data vectors for clusters described by said plurality of membership functions,
  (c2) using the membership values determined and stored in step (c1), determining and storing a center of gravity value for each membership function in said plurality of membership functions, and
  (c3) conducting a further iteration wherein the membership function in each iteration is described by the center of gravity value determined in the preceding iteration;
(d) describing determined membership functions respectively for said plurality of membership functions by the respective center of gravity values of a last iteration of step (c3);
(e) employing said determined membership functions as fuzzy logic rules; and
(f) employing the fuzzy logic rules determined in step (e) for controlling a technical system.

2. A method as claimed in claim 1 wherein step (c) comprises employing a predetermined number of iterations as said abort criterion.

3. A method as claimed in claim 1 wherein step (c) comprises employing a change of the center of gravity value in a current iteration compared to a preceding iteration as said abort criterion.

4. A method as claimed in claim 1 wherein step (c) comprises employing a change of the membership values in a current iteration compared to a preceding iteration as said abort criterion.

5. A method as claimed in claim 1 wherein step (b) comprises determining at least a portion of said initialization parameters according to the fuzzy C-means method.

6. A method as claimed in claim 1 wherein step (b) comprises determining at least a portion of said initialization parameters according to the possibilistic C-means method.

7. A method as claimed in claim 1 wherein step (a) comprising displaying said plurality of membership function types.

8. A method for computerized design of fuzzy logic rules, for controlling a technical system, from training data vectors of a training dataset comprising the steps of:
  (a) storing a plurality of different membership function types in a computer, each membership function type having a plurality of membership functions, and selecting in said computer one of said plurality of membership function types;
  (b) allocating initial membership values to the training data vectors for clusters described by the plurality of membership functions for the membership function type selected in step (a);
  (c) setting an abort criterion and, for each of said plurality of membership functions in the membership function type selected in step (a), iteratively implementing steps (c1), (c2) and (c3) in said computer for all training data vectors,
    (c1) determining and storing a center of gravity value for the membership function,
    (c2) determining and storing membership values for the respective training vectors dependent on said clusters, and
    (c3) conducting a further iteration wherein the membership function in each iteration is described by the center of gravity value determined in the preceding iteration;
  (d) describing determined membership functions respectively for said plurality of membership functions by the respective center of gravity values of a last iteration of step (c3);
  (e) employing said determined membership functions as fuzzy logic rules; and
  (f) employing the fuzzy logic rules determined in step (e) for controlling a technical system.

9. A method as claimed in claim 8 wherein step (c) comprises employing a predetermined number of iterations as said abort criterion.

10. A method as claimed in claim 8 wherein step (c) comprises employing a change of the center of gravity value in a current iteration compared to a preceding iteration as said abort criterion.

11. A method as claimed in claim 8 wherein step (c) comprises employing a change of the membership values in a current iteration compared to a preceding iteration as said abort criterion.

12. A method as claimed in claim 8 wherein step (b) comprises determining at least a portion of said initial membership values according to the fuzzy C-means method.

13. A method as claimed in claim 8 wherein step (b) comprises determining at least a portion of said initial membership values according to the possibilistic C-means method.

14. A method as claimed in claim 8 wherein step (a) comprising displaying said plurality of membership function types.

15. An apparatus for computerized design of fuzzy logic rules from training data vectors of a training dataset, comprising:
  a computer having memory means for storing a plurality of different membership function types, each membership function type having a plurality of membership functions, and selecting in said computer one of said plurality of membership function types as a selected membership function;
  means in said computer for allocating initialization parameters to the plurality of membership functions of the selected membership function types;
  iteration means in said computer for setting an abort criterion and, for each of said plurality of membership functions in the selected membership function type, iteratively operating on all training data vectors, said iteration means comprising means, in each iteration, for determining and storing membership values, as stored membership values for the training data vectors for clusters described by said plurality of membership functions, and for using the stored membership values to determine a center of gravity value for each membership function in said plurality of membership functions, and for storing each center of gravity value, and for conducting a further iteration wherein the membership function in each iteration is described by the center of gravity value determined in the preceding iteration;
  means for describing determined membership functions respectively for said plurality of membership functions by the respective center of gravity values of a last iteration of said iteration means; and
  means for employing said determined membership functions as fuzzy logic rules.

16. An apparatus as claimed in claim 15 wherein said iteration means comprises means for setting a predetermined number of iterations as said abort criterion.

17. An apparatus as claimed in claim 15 wherein said iteration means comprises means for setting a change of the center of gravity value in a current iteration compared to a preceding iteration as said abort criterion.

18. An apparatus as claimed in claim 15 wherein said iteration means comprises means for setting a change of the membership values in a current iteration compared to a preceding iteration as said abort criterion.

19. An apparatus as claimed in claim 15 wherein said means for allocating initialization parameters comprises means for determining at least a portion of said initialization parameters according to the fuzzy C-means method.

20. An apparatus as claimed in claim 15 wherein said means for allocating initialization parameters comprises means for determining at least a portion of said initialization parameters according to the possibilistic C-means method.

21. An apparatus as claimed in claim 15 wherein said computer comprises means for displaying said plurality of membership function types.

22. An apparatus for computerized design of fuzzy logic rules, for controlling a technical system, from training data vectors of a training dataset comprising:
- a computer having memory means for storing a plurality of different membership function types, each membership function type having a plurality of membership functions, and selecting in said computer one of said plurality of membership function types as a selected membership function;
- means in said computer for allocating initialization parameters to the plurality of membership functions of the selected membership function types;
- iteration means in said computer for setting an abort criterion and, for each of said plurality of membership functions in the selected membership function type, iteratively operating on all training data vectors, said iteration means comprising means, in each iteration, for determining and storing membership values, as stored membership values, for the training data vectors for clusters described by said plurality of membership functions, and for using the stored membership values to determine a center of gravity value for each membership function in said plurality of membership functions, and for storing each center of gravity value, and for conducting a further iteration wherein the membership function in each iteration is described by the center of gravity value determined in the preceding iteration;
- means for describing determined membership functions respectively for said plurality of membership functions by the respective center of gravity values of a last iteration of said iteration means;
- means for employing said determined membership functions as fuzzy logic rules; and
- means for employing the fuzzy logic rules for controlling a technical system.

23. An apparatus as claimed in claim 22 wherein said iteration means comprises means for setting a predetermined number of iterations as said abort criterion.

24. An apparatus as claimed in claim 22 wherein said iteration means comprises means for setting a change of the center of gravity value in a current iteration compared to a preceding iteration as said abort criterion.

25. An apparatus as claimed in claim 22 wherein said iteration means comprises means for setting a change of the membership values in a current iteration compared to a preceding iteration as said abort criterion.

26. An apparatus as claimed in claim 22 wherein said means for allocating initialization parameters comprises means for determining at least a portion of said initialization parameters according to the fuzzy C-means method.

27. An apparatus as claimed in claim 22 wherein said means for allocating initialization parameters comprises means for determining at least a portion of said initialization parameters according to the possibilistic C-means method.

28. An apparatus as claimed in claim 22 wherein said computer comprises means for displaying said plurality of membership function types.

29. An apparatus for computerized design of fuzzy logic rules from training data vectors of a training dataset, comprising:
- a computer having memory means storing a plurality of different membership function types, each membership function type having a plurality of membership functions, and selecting in said computer one of said plurality of membership function types as a selected membership function;
- means in said computer for allocating initial membership values to the training data vectors for clusters described by the plurality of membership functions for the selected membership function types;
- iteration means in said computer for setting an abort criterion and, for each of said plurality of membership functions in the selected membership function type, iteratively operating on all training data vectors, said iteration means comprising means, in each iteration, for determining and storing a center of gravity value for the membership function, for determining and storing membership values for the respective training vectors dependent on said clusters, and for conducting a further iteration wherein the membership function in each iteration is described by the center of gravity value determined in the preceding iteration;
- means for describing determined membership functions respectively for said plurality of membership functions by the respective center of gravity values of a last iteration said iteration means; and
- means for employing said determined membership functions as fuzzy logic rules.

30. An apparatus as claimed in claim 29 wherein said iteration means comprises means for setting a predetermined number of iterations as said abort criterion.

31. An apparatus as claimed in claim 29 wherein said iteration means comprises means for setting a change of the center of gravity value in a current iteration compared to a preceding iteration as said abort criterion.

32. An apparatus as claimed in claim 29 wherein said iteration means comprises means for setting a change of the membership values in a current iteration compared to a preceding iteration as said abort criterion.

33. An apparatus as claimed in claim 29 wherein said means for allocating initial membership values comprises means for determining at least a portion of said initial membership values according to the fuzzy C-means method.

34. An apparatus as claimed in claim 29 wherein said means for allocating initial membership values comprises means for determining at least a portion of said initial membership values according to the possibilistic C-means method.

35. An apparatus as claimed in claim 29 wherein said computer comprises means for displaying said plurality of membership function types.

36. An apparatus for computerized design of fuzzy logic rules, for controlling a technical system, from training data vectors of a training dataset comprising:

a computer having memory means storing a plurality of different membership function types, each membership function type having a plurality of membership functions, and selecting in said computer one of said plurality of membership function types as a selected membership function;

means in said computer for allocating initial membership values to the training data vectors for clusters described by the plurality of membership functions for the selected membership function types;

iteration means in said computer for setting an abort criterion and, for each of said plurality of membership functions in the selected membership function type, iteratively operating on all training data vectors, said iteration means comprising means, in each iteration, for determining and storing a center of gravity value for the membership function, for determining and storing membership values for the respective training vectors dependent on said clusters, and for conducting a further iteration wherein the membership function in each iteration is described by the center of gravity value determined in the preceding iteration;

means for describing determined membership functions respectively for said plurality of membership functions by the respective center of gravity values of a last iteration said iteration means; and means for employing said determined membership functions as fuzzy logic rules; and means for employing the fuzzy logic rules for controlling a technical system.

37. An apparatus as claimed in claim 36 wherein said iteration means comprises means for setting a predetermined number of iterations as said abort criterion.

38. An apparatus as claimed in claim 36 wherein said iteration means comprises means for setting a change of the center of gravity value in a current iteration compared to a preceding iteration as said abort criterion.

39. An apparatus as claimed in claim 36 wherein said iteration means comprises means for setting a change of the membership values in a current iteration compared to a preceding iteration as said abort criterion.

40. An apparatus as claimed in claim 36 wherein said means for allocating initial membership values comprises means for determining at least a portion of said initial membership values according to the fuzzy C-means method.

41. An apparatus as claimed in claim 36 wherein said means for allocating initial membership values comprises means for determining at least a portion of said initial membership values according to the possibilistic C-means method.

42. An apparatus as claimed in claim 50 wherein said computer comprises means for displaying said plurality of membership function types.

* * * * *